June 11, 1968     S. A. BLACK ET AL     3,388,024
TIRE CARCASS BUILDING DRUM
Original Filed Jan. 17, 1964     2 Sheets-Sheet 1

INVENTORS
Sheppard A. Black
John D. Heide
BY
Jack Rosin
ATTORNEY

June 11, 1968  S. A. BLACK ET AL  3,388,024
TIRE CARCASS BUILDING DRUM
Original Filed Jan. 17, 1964  2 Sheets-Sheet 2
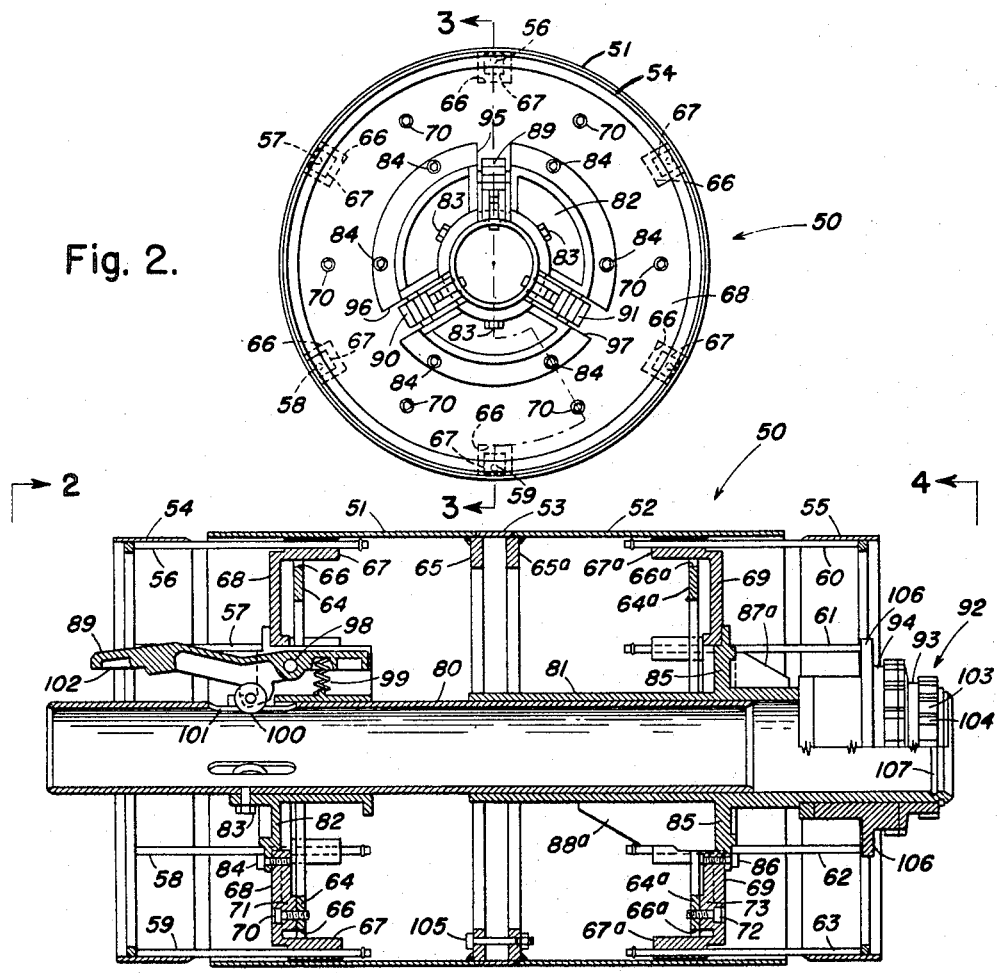
Fig. 2.
Fig. 3.
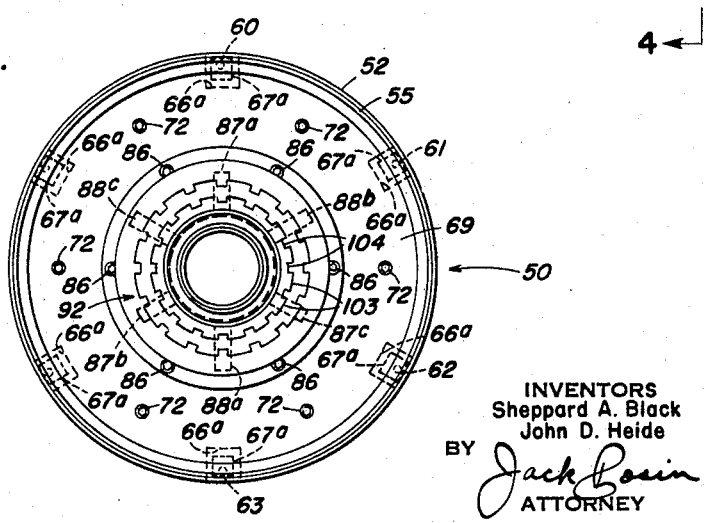
Fig. 4.
INVENTORS
Sheppard A. Black
John D. Heide
BY *Jack Rosin*
ATTORNEY United States Patent Office 3,388,024
Patented June 11, 1968

3,388,024
TIRE CARCASS BUILDING DRUM
Sheppard A. Black, Wayne, and John D. Heide, Ramsey, N.J., assignors to Uniroyal, Inc., a corporation of New Jersey
Original application Jan. 17, 1964, Ser. No. 338,326, now Patent No. 3,355,346, dated Nov. 28, 1967. Divided and this application June 15, 1967, Ser. No. 646,248
4 Claims. (Cl. 156—415)

ABSTRACT OF THE DISCLOSURE

A tire building drum having axially spaced end portions separated by a spacer element which is replaceable in order to vary the length of the drum, each drum end portion being provided with a central, hollow shaft member which telescopes with the shaft member of the other to compensate for changes in length of the drum.

The foregoing abstract is neither intended to define the invention disclosed in this specification, nor is it intended to be limiting as to the scope of the invention in any way.

Cross reference to related application

This application is a division of our copending application Ser. No. 338,326, filed Jan. 17, 1964, and entitled, Automatic Tire Building Apparatus, now U.S. Patent 3,355,346.

Background of the invention

This invention relates to tire building drums and, more particularly, to drums for use with apparatus capable of continuously building tires of a number of different sizes, for example apparatus as described and claimed in our above-mentioned application.

In a continuous tire building system of the type described in said copending application, cylindrical drums are moved past a number of operating stations at which auxiliary units perform successive manufacturing steps to progressively build up raw tires on the drums. In such a system, the sizes of the tires built by the apparatus are dependent on the lengths of the cylindrical drums utilized therein and the various auxiliary units are constructed and arranged to perform their operation on all of the different sized drums employed in the system. This arrangement increases the flexibility and economy of the system.

Summary of the invention

In order to avoid the necessity of providing numerous drums of a number of different sizes for use in the aforementioned continuous building system, it has been found economical and desirable, in accordance with the present invention, to provide drums whose length may be easily changed to facilitate building thereon at different times tires of different sizes.

Accordingly, it is the primary object of this invention to provide an improved tire building drum.

It is another object of this invention to provide a tire building drum whose length can be conveniently changed.

Another object of this invention is to provide an improved tire building drum with length changing capabilities for use in apparatus for continuously building tires.

Further objects and advantages of this invention will become apparent as the following description proceeds.

Briefly stated, and in accordance with one embodiment of this invention, there is provided a tire building drum, comprising first and second cylindrical axially aligned shell members; a cylindrical spacer member of predetermined length positioned between and axially aligned with said shell members, said members together forming a hollow cylinder; first and second wall members carried by and internally of said first and second shell members, respectively; first and second hollow telescoping shafts carried by said first and second wall members, respectively, coaxially with said cylinder; and fastening means cooperable with said shell members for rigidly interconnecting said shell and spacer members to form a unitary drum, the length of said drum being selectively variable by replacing said spacer member with a similar member of different length, whereby said drum may be employed in building tires of any one of a number of different lengths.

Brief description of the drawings

While the specification concludes with one or more claims particularly pointing out and distinctly claiming the subject matter of this invention, it is believed that the invention will be better understood from the following description, taken in conjunction with the accompanying drawings, in which:

FIG. 2 is an end elevational view, taken along the line 2—2 of FIG. 3 of a tire building drum in accordance with the present invention which may be used in the apparatus of FIG. 1;

FIG. 3 is a sectional elevational view of the tire building drum, taken along the line 3—3 of FIG. 2; and FIG. 4 is an end elevational view of the tire building drum, taken along the line 4—4 of FIG. 3.

Description of the preferred embodiment

Figure 1:
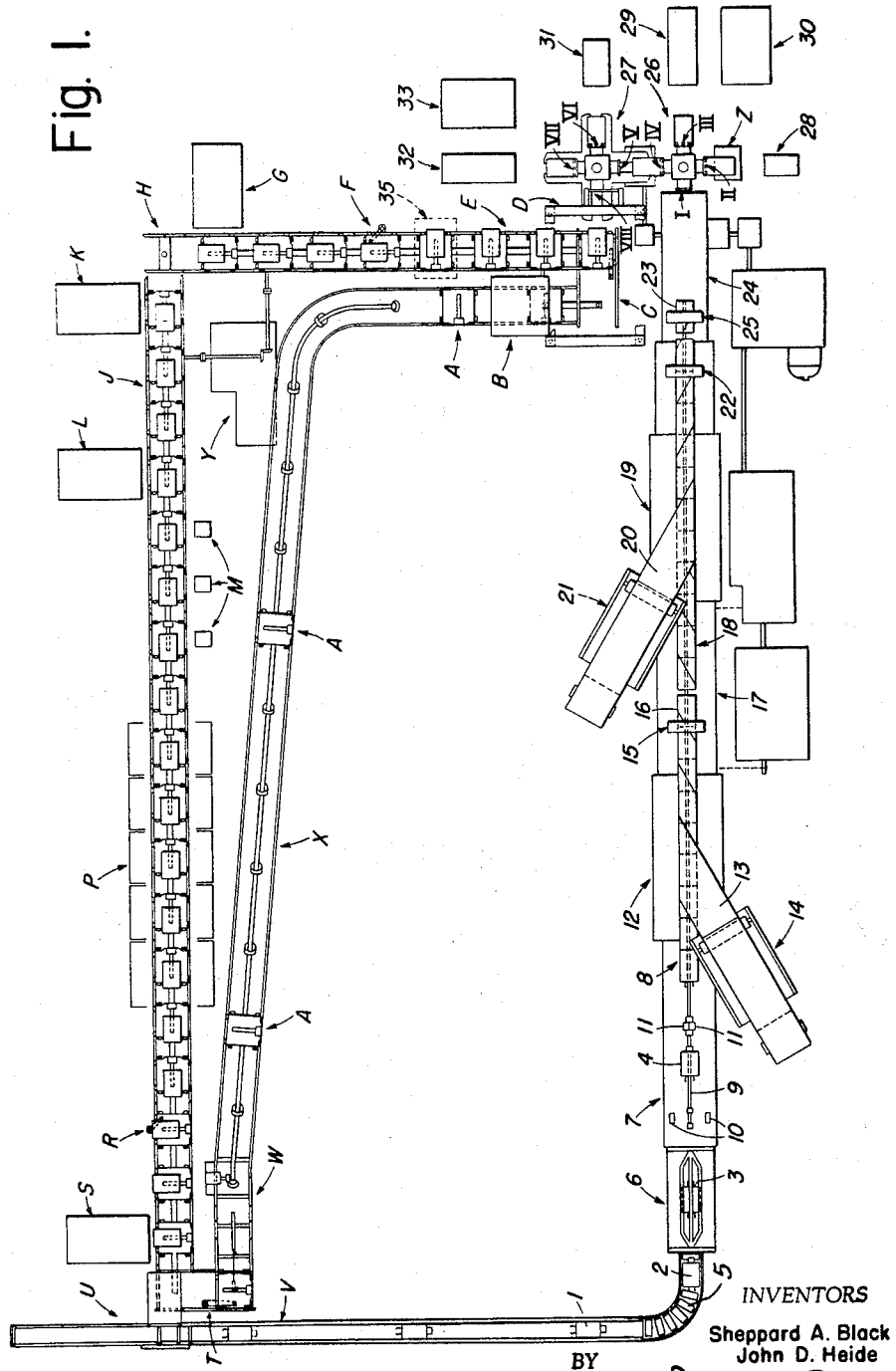
FIG. 1 is a synoptic plan view of apparatus in accordance with said copending application Ser. No. 338,326 for continuously building tires of a number of different sizes.

For purposes of clarity the present invention has been illustrated in FIG. 1 in conjunction with the tire building apparatus of said copending application Ser. No. 338,326.

Beginning at the lower left-hand side of FIG. 1, which represents the drum input end of the apparatus, this description will continue with an initial, general discussion of the apparatus of said copending application, and, following that, the present invention will be described in detail. The apparatus continuously handles, for example, eighty tire building drums, including drums 1 through 4. As will appear in greater detail hereinafter, each drum is preferably a rigid metal cylinder with a hollow central region, having a grooved cone attached to one end thereof and a cam-actuated set of locking fingers attached to the other end of the drum, the locking fingers of one drum being engageable with the cone of a following drum to lock the two together for movement as a unit. A pair of annular bands or rings are slidably and telescopically mounted at the ends of each drum for supporting the skirt portions of ply fabric between the drums.

The drums are guided to the input of the apparatus by means of rollers 5 and are led into the first unit of the apparatus, a band positioner unit 6. This unit extends the bands of the drums outwardly of the ends thereof. In accomplishing this, displaceable arms having fingers first grip, then move, and, finally, release the bands while each drum is in the band-positioning unit.

The second unit of the apparatus is a drum loader 7 for successively moving the drums into a line of interconnected drums, designated generally at 8. The drum loader moves the drums onto and along a portion of an elongated cam, shown generally at 9, which extends through the ply winding and cutting portions of the apparatus. Drum loader 7 has two sets of clamps 10—10 and 11—11 which hold the upstream end of cam 9 rigidly and cooperate in loading drums on the cam. The clamps 10—10 and 11—11 open and close alternately so that each drum can be moved onto cam 9 in a series of steps during which clamps 10—10 open, a drum is pushed onto cam 9 between clamps 10—10 and 11—11, clamps 10—10 close, and then clamps 11—11 open. The drum is then pushed forward or downstream past clamps 11—11 and into engagement with the line 8 of interconnected drums. Clamps 11—11 then close to prepare for the next loading cycle. The locking fingers of the previous last drum in the line close on the cone of the added drum due to the action of cam 9, which is actually located with respect to the drums and employs a stepped diameter to control the operation of the locking fingers on the drums.

The interlocked drums are then driven through a winding frame 12 having a series of driving wheels located in a line at the bottom of the drums and on each side of the drums. These wheels are rotatable and are mounted on adjustable swivels so that they can be angularly aligned to impart both rotational and longitudinal movement to the line 8 of interconnected drums. Fabric 13 is applied to the line of interconnected drums from a fabric let-off unit 14 mounted on one side of winding frame 12, and positioned to wind the fabric onto the drums at a predetermined cord angle.

After passing through the winding frame, the drums in line 8 move to a fabric cutting unit 15. This unit includes a high speed rotary knife so mounted on a frame as to permit it to be rotated circumferentially about the drum line 8. The frame, in turn, is longitudinally movable in synchronism with the longitudinal movement of drum line 8 so that, on signal, cutting unit 15 may be actuated to circumferentially cut the fabric between the drums.

After the fabric between drums is cut, the lead drum 16 of drum line 8 advances over a portion of cam 9 which opens the locking fingers and frees this drum from the following drums. A transfer unit 17 then advances this drum to a second line 18 of interconnected drums and this drum joins drum line 18. The transfer unit 17 and cam 9 are cooperatively arranged to cause the new drum and preceding drum in drum line 18 to be locked together with a new and different spacing between drums from that between the drums in drum line 8. This is done to provide for subsequent step-off between the fabric layers in the bead areas of the carcasses.

The interlocked drums in drum line 18 are then advanced through a second winding frame 19, which is similar to winding frame 12, and is supplied with fabric 20 from a fabric let-off unit 21 that is similar to unit 14. The winding frame 19 and let-off unit 21 are preferably of opposite hand to winding frame 12 and let-off unit 14 so that the cords of the second ply on each drum cross the cords of the first ply. Thereafter, the second ply is cut by a fabric cutting unit 22 that is similar to unit 15.

When the cutting of the fabric between the lead drum and next subsequent drum in drum line 18 is completed, the locking fingers of the lead drum are opened by cam 9 and this drum is disconnected from the remainder of the line, as shown by drum 23. This drum, although disconnected from the drum line 18, is pushed downstream by the new lead drum of the line and enters a turret loading unit 24.

Turret loading unit 24 is provided with a longitudinally movable clamping mechanism 25 which grasps drum 23 and moves it toward the first turret 26 of a pair of turrets 26, 27 that form a dual turret assembly. During this movement, the lead drum is disengaged from cam 9 and brought into engagement with one of four drum supporting arms on turret 26, the drum thereupon being grasped firmly by the arm. After this, clamping mechanism 25 releases the drum and returns to its starting position, leaving the drum engaged with and carried by turret 26.

Turrets 26 and 27 are adapted to be intermittently and simultaneously angularly turned or indexed through 90° counterclockwise steps. Roman numerals I, II, III and IV represent fixed positions with respect to turret 26, while Roman numerals V, VI, VII and VIII represent fixed positions with respect to turret 27. Accordingly, drums carried by the turrets index from one to another of the fixed positions as the turrets advance in 90° steps.

Various independent operations are performed on the drums at several of the fixed positions I through VIII. These operations take place during the time interval occurring between consecutive indexing steps of the turrets. When all of the operations have been completed a signal is developed that initiates indexing of the two turrets and, upon completion of indexing, the various operations which occur at positions I through VIII begin anew, the cycle being repeated so long as the machine is in operation.

A duration of, for example, 7½ seconds may be utilized as the nominal time period for a complete indexing cycle in order to provide sufficient time for each of the various operations to take place at the turrets. Of this period, approximately 1½ seconds is consumed by the actual indexing movement of the turrets, and the remaining 6 seconds provide adequate time for the various other operations to be performed.

As indicated by the earlier discussion of turret loader 24, position I of turret 26 represents the turret loading position.

A heating unit 28 may be employed at position II of turret 26 to heat the radially inner portions of the projecting free ends of the carcasses while the drums are at this position in order to increase the tackiness of the inner ply ends to facilitate subsequent toe strip application. The heating step would be employed or not, as required, depending on the condition of the ply material being handled at a given time. Heating unit 28 may comprise a circular heating element of slightly smaller outside diameter than the inside diameter of the carcasses, the heating element being movable from a location at position II remote from the projecting ends of the carcasses to a location in which the heating element is overlapped by the projecting ends of the carcasses at position II.

During the time interval between consecutive index steps of the turrets, a bead setter 29 located adjacent to position III of turret 26 is utilized to apply a bead ring to and form the bead area of the projecting end of the carcass carried by the drum at position III. A bead servicer 30 associated with bead setter 29 serves to keep the bead setter supplied with a continuous flow of bead rings.

Positions IV (turret 26) and V (turret 27) are employed in transferring carcass bearing drums between the two turrets. Each of the four drum supporting arms of turret 27 is mounted on a movable carriage that can, while it is at position V, move into engagement with the projecting end of a drum at position IV, grasp this drum and shift it over to position V. The transfer of drums from position IV to position V causes the drums to be reversed 180° with respect to turret 27 so that the unbeaded ends of the carcasses are remote from the center of turret 27.

A second heating unit 31, which is similar to the first heating unit 28, performs the function of heating the radially inner portions of the new projecting free ends of the carcasses while the drums are at position VI.

A second bead setter 32 and bead servicer 33 are provided at position VII of turret 27 to perform functions similar to those of the aforementioned bead setter 29 and bead servicer 30 with respect to the new projecting ends of the carcasses at position VII.

At position VIII of the turrets, the drums, still carrying the carcasses, are removed from the turret and transferred to a series of drum carriers or movable pallets identified generally by the letter A. The carriers A are used to rotatably support the drums during their movement through the remainder of the tire building apparatus of FIG. 1.

A shuttle loader unit B is employed to transfer carriers A from a chain driven carrier return conveyor X to a shuttle unit C, delivering the carriers thereto in discrete steps timed with the indexing cycle of turrets 26 and 27. Shuttle unit C, in turn, shifts the carriers A toward a turret unloader unit D, the movements of the shuttle unit and turret unloader unit also being in synchronism with the turret indexing cycle. Turret unloader unit D is provided with a movable clamping means that grasps the carcass bearing drums on their arrival at position VIII and transfers the drums from turret 27 to the carriers A.

The apparatus comprising elements 6 through 33 heretofore discussed is capable of building carcasses of different sizes, depending on the lengths of the drums (e.g., drums 1–4) employed, as long as the drum diameters are all maintained at the design value. The sizes of the various carcasses built by elements 6–33 are communicated to the remaining components of FIG. 1 through the use of memory and signalling devices located on the various carriers A. The memory and signalling device of each carrier is set, at the time a drum is loaded thereon, to reflect the length of the carcass on the carrier. Thereafter, in progressing through the remaining components of FIG. 1, this information is transmitted by such devices to the various auxiliary components that operate upon the drums. For convenience, apparatus capable of handling carcasses of three different lengths is considered herein, the distinction in carcass sizes being hereinafter brought out by referring to the carcasses (or the drums) as being short length, medium length, or long length carcasses (or drums).

After being loaded with a drum, each carrier A is shifted in progressive steps onto and through the various stations on one leg E of a conveyor system, the steps being timed in relation to the indexing of turrets 26 and 27. At the third station on leg E, an automatic toe strip applicator unit 35, which is positioned above the carrier, may be employed to apply toe strips to the end portions of each carcass. Alternatively, this operation may be performed manually by men located at either side of conveyor leg E at the third station.

At the fourth station on leg E, a lift and turn unit F, which is positioned beneath the carrier and between the rails of the conveyor, is actuated to raise the carrier, rotate it 90° counterclockwise and then lower the carrier back onto the conveyor. This aligns the axis of the drum on that carrier with the direction of movement of the carriers along the conveyor leg E and orients the drum with respect to a tread applicator unit G.

Tread applicator G is utilized to wind treads about all carcasses of a given size (e.g., the short length carcasses) when they reach the seventh station on leg E. Depending on the size of the carcass on the carrier adjacent tread applicator G, the memory and signalling device of this carrier will either signal the tread applicator to apply or not to apply a tread to the carcass.

A corner turn unit H is located at the next station past tread applicator G. Corner turn unit H receives each carrier in succession from the first leg E of the conveyor system and rotates the carrier 90° counterclockwise to align the axis of the drum thereon with a second leg J of the conveyor system. Thereafter, the carrier is transferred to the first station on leg J of the conveyor system, the carrier at this time being positioned adjacent to a tread applicator unit K.

Tread applicator unit K is similar to tread applicator unit G but is only actuated to cycle when the memory and signalling device on the carrier informs it that a medium length carcass is carried thereon. Unit K, of course, will be supplied with proper sized tread slabs to fit the medium length carcasses.

Successive steps of the conveyor bring the carrier past the second and third, spare, stations on leg J to the fourth station, at which another tread applicator unit L is positioned. This unit is also similar to tread applicator unit G and serves to apply tread slabs to long length carcasses only, the memory and signalling device on the carrier being utilized to inform the unit whether or not a long length carcass is to be applied at this station.

The next three stations along leg J of the conveyor system are manual stations M at which men may be positioned to manually accurately align and smooth out the overlapping portions of the tread slabs applied by the tread applicator units G, K and L. Each of the manual stations M is provided with a manually controlled drive mechanism for selectively rotating the drums during the aligning and smoothing out of the treads.

After passing manual stations M, the carcasses are moved by the carriers in step by step progression past a spare station and then through five consecutive stitching stations, each of which is provided with a dual stitching unit P. Each of the dual stitching units P stitch a portion of the outer surfaces of the carcasses and these operations cumulatively result in the stitching of the entire outer surface of each carcass. At this point the carcasses have been fabricated into raw tires.

After passing stitching units P and two subsequent spare stations, the carriers proceed to the next station on leg J of the conveyor system. At this station a second lift and turn unit R, which is similar to lift and turn unit F, is provided to raise each carrier above the conveyor, rotate it 90° clockwise and then redeposit it onto the conveyor. This positions the drum axis of the carrier transverse to the direction of movement of the drums along leg J and sets up the drum for subsequent removal of the raw tire thereon by a raw tire remover unit S.

Raw tire remover S serves to grasp the raw tire and remove it from the drum by pulling on the tire while the drum remains fixed to the carrier A. Upon removal, the completed raw tire can be further processed in accordance with known practices through the remaining steps in a tire building operation, including, for example, the shaping and vulcanizing of the carcass.

With the tire removed from its drum, the carrier adjacent to raw tire remover S is then shifted forward onto a second shuttle unit T. This shuttle unit is quite similar to shuttle unit C. However, it cooperates with a drum remover unit U to remove the drums from the carriers, rather than cooperating with the turret unloader D in placing drums on the carriers. Shuttle unit T shifts the carriers away from drum remover unit U, while the drum remover unit holds the drums stationary. This disengages the drums from the carriers, and the drums are then transferred to a drum return conveyor V which routes the drums back to the input end of the band positioner unit 6.

In addition to the foregoing, the shifting of the carriers on shuttle unit T brings them into alignment with a carrier removal device W. This device then engages the carriers and transfers them from the shuttle unit to the chain driven carrier return conveyor X. Carrier return conveyor X, in turn, returns the carriers A to the input of shuttle loader unit B.

A main drive unit Y provides the driving force for stepping the carriers A through the various stations on legs E and J of the conveyor system. In addition, by means of a power take off interconnection between leg E and shuttle loader B, main drive unit Y also provides the driving force for shifting carriers from shuttle loader B onto shuttle C.

In order to determine the length of the carcasses that are to be mounted upon carriers A, and to provide signals used in setting the memory and signalling device of each carrier, a programming mechanism Z, located adjacent to position II of turret 26 is employed. Programming mechanism Z operates in conjunction with a pair of photocells at position I of turret 26 to determine the length of the carcasses arriving at turret 26. It distributes this information to various other components associated with turrets 26 and 27, and to a mechanism employed in setting the memory and signalling devices of the carriers.

Referring to FIGS. 2, 3 and 4, the present invention will now be considered in greater detail by reference to the tire building drum 50 shown therein. Drum 50 includes outer shell members 51 and 52 (FIG. 3) which, together with a spacer member 53 and a pair of displaceable bands 54 and 55, form the outer support or working surface of the drum. Band 54 is supported from the interior of drum 50 by means of a plurality of slidably supported rods including rods 56 through 59, while band 55 is similarly supported by a series of rods including rods 60 through 63. Bands 54 and 55 are each slightly smaller in diameter than shell members 51 and 52 to facilitate their being telescoped within the shell members.

Shell member 51 is stiffened by means of annular wall members 64 and 65, which are welded to the inner periphery thereof. Corresponding annular wall members 64a and 65a are utilized in stiffening shell member 52. The annular wall members 64 and 64a are provided with slots 66 and 66a, respectively, at spaced locations about their peripheries to accommodate bosses or journal housings 67 and 67a, respectively. Bosses 67 support slidable rods 56 through 59 and are fixedly supported by a vertical, annular wall member 68, while bosses 67a support slidable rods 60 through 63 and are fixedly supported by a vertical, annular wall member 69.

Wall member 68 is fastened to wall member 64 by means bolts 70 which are drawn sufficiently tight to insure that raised portions 71 on wall member 68 abut firmly against wall member 64. A similar arrangement including bolts 72 and raised portions 73 is employed in fastening wall member 69 to wall member 64a.

Hollow, telescoped shafts 80 and 81 are positioned internally of and concentric with outer shell members 51 and 52, respectively. Shaft 80 is bolted to and supported by a hub member 82 by means of bolts 83, the hub member 82, in turn, being fastened to annular wall member 68 via bolts 84. Shaft 81, on the other hand, is provided with an upstanding flange portion 85 which, in turn, is fastened to annular wall member 69 by bolts 86. A series of webs 87a, 87b and 87c reinforce one side of flange 85 with respect to shaft 81, while a second series of webs 88a, 88b and 88c reinforce the other side of flange 85 with respect to that shaft.

Each drum 50 includes a plurality of movable fingers 89, 90 and 91, at one end of the drum and a tapered or conical device 92 having a plurality of axially spaced circumferential grooves 93 and 94 at the other end of the drum. The fingers 89, 90 and 91 of one drum and the conical device 92 of an adjacent drum serve as a means for interconnecting the adjacent drums with a predetermined spacing therebetween.

The fingers 89, 90 and 91 are carried in slots 95, 96 and 97, respectively, formed in the hub member 82. The fingers are pivotally supported from the hub member by means of pins 98 which are supported by the walls of the slots 95, 96 and 97. Each of the fingers is spring loaded radially inwardly by means of a spring 99 and is provided with a roller 100. Rollers 100 extend through slots 101 in the hollow shaft 80 and are actuated by the stepped diameter of cam 9 (FIG. 1). One of the three fingers of each drum, for example the finger 89 (FIG. 3), has a web 102 that is engageable with selected longitudinal ribs 103 and slots 104 in conical device 92 to provide a rotational lock bewteen adjacent interconnected drums.

The length of the drums 50 may be changed by removing the spacer ring 53 and inserting a spacer ring of greater or lesser length, as desired, in order to allow carcasses of greater or lesser length to be fabricated upon the drums. To this end, a series of circumferentially spaced bolts 105 are utilized to join the annular wall members 65 and 65a together in a rigid relationship. Bolts 105 may be reached by first removing bolts 84 and pulling out hub member 82 and hollow shaft 80 from their positions within outer shell 51. Alternatively, bolts 70 can be opened to remove not only shaft 80 and hub member 82 but also the annular wall member 68 and the displaceable band 54 to provide a greater opening within which to get at the bolts 105. Similarly, the components at the opposite end of the drum can be removed to allow access into the space within outer shell 52 for the purpose of reaching bolts 105 to change the size of spacer plate 53. From the foregoing it will be apparent that there has been provided a drum 50 whose longitudinal length may be changed as desired to build carcasses of different lengths.

In order to provide a means by which the drum 50 may be detachably interconnected with a carrier or pallet A (FIG. 1), the end of the drum having the conical device 92 (FIG. 3) is provided with a flange 106 and a groove 107. Flange 106 is formed on the external periphery of hollow shaft 81, and groove 107 is formed on the internal periphery thereof. Flange 106 and groove 107 are engaged by a hook and by detents, respectively, to lock the drum 50 in a predetermined position relative to the carriers A, as described in greater detail in said copending application Ser. No. 338,326, now U.S. Patent No. 3,355,346.

While there has been shown and described what is at present considered to be the preferred embodiment of this invention, it will be obvious to those skilled in the art that various changes and modifications may be made therein without departing from this invention in its broader aspects, and it is, therefore, aimed in the appended claims to cover all such changes and modifications as fall within the true spirit and scope of this invention.

Having thus described our invention, what we claim and desire to protect by Letters Patent is:

1. A tire building drum, comprising: first and second cylindrical, axially aligned shell members; a cylindrical spacer member of predetermined length positioned between and axially aligned with said shell members, said members together forming a hollow cylinder; first and second wall members carried by and internally of said first and second shell members, respectively; first and second hollow telescoping shafts carried by said first and second wall members, respectively, coaxially with said cylinder; and fastening means cooperable with said shell members for rigidly interconnecting said shell and spacer members to form a unitary drum, the length of said drum being selectively variable by replacing said spacer member with a similar member of different length, whereby said drum may be employed in building tires of any one of a number of different lengths.

2. A tire building drum as described in claim 1 and further including a generally conical device at one end of said drum, said device having a plurality of grooves spaced axially of the drum, and a hub member at the other end of said drum, said hub member having a plurality of pivotally mounted, spring-loaded fingers thereon, said fingers being disposed to couple the drum selectively to a groove on the conical device of a like adjacent drum to substantially prevent axial and rotational relative movement between said drums.

3. A tire building drum, comprising: first and second cylindrical, axially aligned shell members; a cylindrical spacer member of predetermined length positioned between and axially aligned with said shell members, said members together forming a hollow cylinder; first and second wall members rigidly fixed to the interior of said first and second shell members, respectively; first and second hollow telescoping shafts rigidly fixed to said first and second wall members, respectively, coaxially with said cylinder; and fastening means cooperable with said shell members for rigidly interconnecting said shell and spacer members to form a unitary drum, the length of said drum being selectively variable by replacing said spaced member with a similar member of different length, whereby said drum may be employed in building tires of any one of a number of different lengths.

4. A tire building drum as described in claim 3 and further including a generally conical device at one end of said drum, said device having a plurality of grooves spaced axially of the drum, and a hub member at the other end of said drum, said hub member having a plurality of pivotally mounted, spring-loaded fingers thereon, said fingers being disposed to couple the drum selectively to a groove on the conical device of a like adjacent drum to substantially prevent axial and rotational relative movement between said drums.

References Cited

UNITED STATES PATENTS

| 3,178,331 | 4/1965 | Bishop et al. | 156—415 |
| 3,207,648 | 9/1965 | Shilts | 156—415 |

EARL M. BERGERT, *Primary Examiner.*

HAROLD ANSHER, *Examiner.*